United States Patent

Cowley et al.

[11] Patent Number: 5,178,654
[45] Date of Patent: Jan. 12, 1993

[54] WET SCRUBBER APPARATUS

[75] Inventors: Steve R. Cowley; Bradley S. McCoy, both of Grand Junction, Colo.

[73] Assignee: Spendrup and Associates, Inc., Grand Junction, Colo.

[21] Appl. No.: 885,760

[22] Filed: May 19, 1992

[51] Int. Cl.$^5$ .................. B01D 45/08; B01D 47/00
[52] U.S. Cl. ...................... 55/257.2; 55/257.5; 55/257.6; 55/440; 55/443; 55/465
[58] Field of Search .......... 55/257.1, 257.2, 257.3, 55/257.5, 257.6, 440–445, 462, 465, DIG. 37

[56] References Cited

U.S. PATENT DOCUMENTS

| 1,170,308 | 2/1916 | Mertz | 55/257.1 |
|---|---|---|---|
| 2,712,929 | 7/1955 | Wilson | 55/257.2 X |
| 2,833,373 | 5/1958 | Custer | 55/442 X |
| 2,834,428 | 5/1958 | Ghai et al. | 55/442 |
| 2,854,090 | 9/1958 | Slough | 55/257.1 |
| 2,989,145 | 6/1961 | Goodloe | 55/443 |
| 3,036,417 | 5/1962 | Maré et al. | 55/257.1 X |
| 3,141,910 | 7/1964 | Pearce | 55/444 X |
| 3,289,398 | 12/1966 | McIlvaine | 55/440 |
| 3,372,530 | 3/1968 | Zimmer | 55/257.3 |
| 3,581,474 | 6/1971 | Kent | 55/257.1 X |
| 3,757,498 | 9/1973 | Hurlbut, Sr. et al. | 55/DIG. 37 |
| 3,899,427 | 8/1975 | Connelly et al. | 55/440 X |
| 4,175,933 | 11/1979 | James | 55/259 |
| 4,319,898 | 3/1982 | Maierhofer | 55/444 X |
| 4,484,937 | 11/1984 | James et al. | 55/229 X |
| 4,714,055 | 12/1987 | Sundheimer | 55/440 X |

FOREIGN PATENT DOCUMENTS

| 54-139170 | 10/1979 | Japan | 55/440 |
|---|---|---|---|
| 1-104318 | 4/1989 | Japan | 55/440 |
| 2057911 | 4/1981 | United Kingdom | 55/257.1 |

Primary Examiner—Robert Spitzer
Attorney, Agent, or Firm—Donald W. Erickson

[57] ABSTRACT

A wet scrubber system for removing dust such as coal dust from the air. The system includes an impingement board and demister. The impingement board comprises a frame with flat strips of metal or plastic attached thereto. The strips are spaced apart to permit passage of an airstream. The demister comprises a first and second row of generally V-shaped members separated by an expanded metal screen. The V-shaped members are offset, spaced apart and tack welded, at their base, to the screen to form a generally Z-shaped pattern.

8 Claims, 3 Drawing Sheets

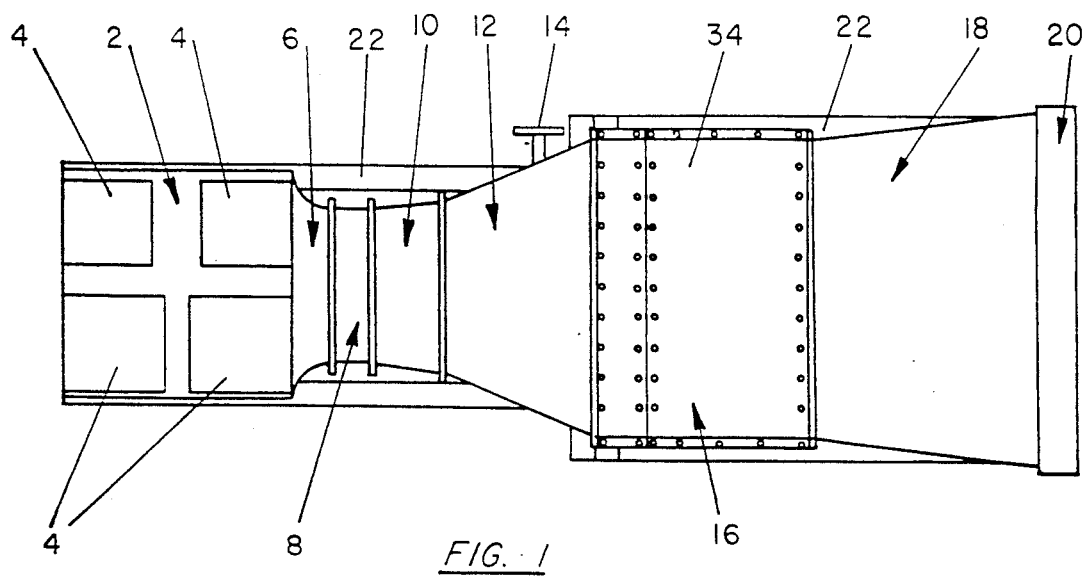
FIG. 1
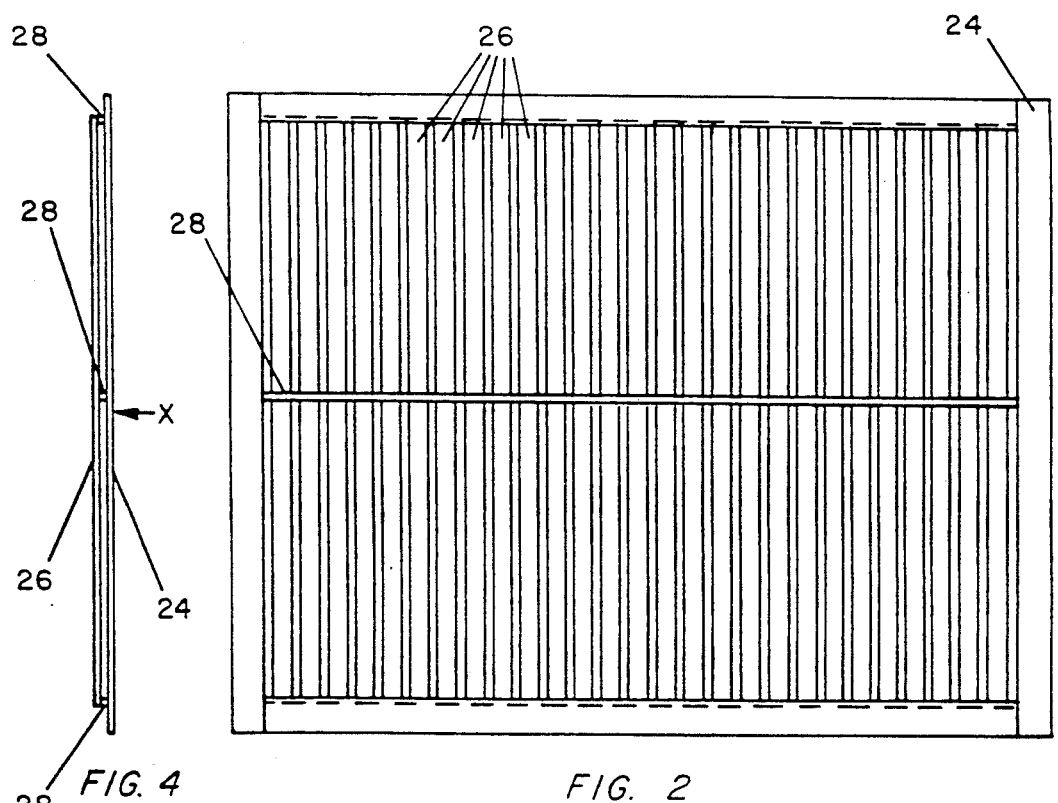
FIG. 4
FIG. 2
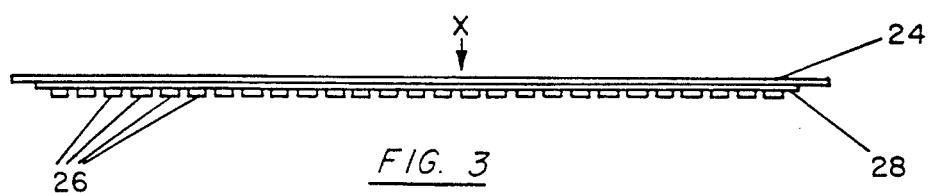
FIG. 3

WET SCRUBBER APPARATUS

BACKGROUND OF THE INVENTION

This invention relates to scrubber apparatus for removing small particles of dust such as coal dust from the air. The apparatus of the present invention is particularly useful in controlling coal dust in preparation rooms of coal fired electric generation plants where coal is pulverized to a small size for efficient combustion. The apparatus is useful also for controlling coal dust generated in underground coal mining by machines such as the long wall mining machines. The efficiency of the present apparatus increases the safety and health of operational personnel, as well as the surrounding environment. Prior art apparatus is exemplified by U.S. Pat. No. 3,757,498, issued Sep. 11, 1973, U.S. Pat. No. 4,175,933, issued Nov. 27, 1979, and U.S. Pat. No. 4,484,937, issued Nov. 27, 1984. The foregoing prior art apparatus utilize the principle of wet scrubbing for control of dust as does the apparatus of the present invention.

SUMMARY OF THE INVENTION

The scrubber apparatus of the present invention is based on the principle of wet scrubbing for removing dust from an air stream. Briefly stated, an air stream containing the dust such as coal dust is wetted with water and impinged onto an efficient and unique impingement board which removes the major part of the dust as a mixture of dust and water. The air stream which passes through and emerges from the back of the impingement board is reduced in water and dust content. To further reduce the amount of moisture and dust in the air stream, the air stream next passes through a unique primary demister in accordance with the present invention. A secondary demister and final filter, not part of the present invention, can be used to insure essentially total removal of moisture and dust.

BRIEF DESCRIPTION OF THE DRAWINGS

FIG. 1 is a top plan view of a wet scrubber system typical of the scrubber systems in which the impingement board and demister of the present invention can be utilized;

FIG. 2 is a front elevational view of the impingement board of the present invention;

FIG. 3 is a top plan view of the impingement board of FIG. 2;

FIG. 4 is a side elevational view of the impingement board of FIG. 2;

DETAILED DESCRIPTION OF THE INVENTION

Figure 5:
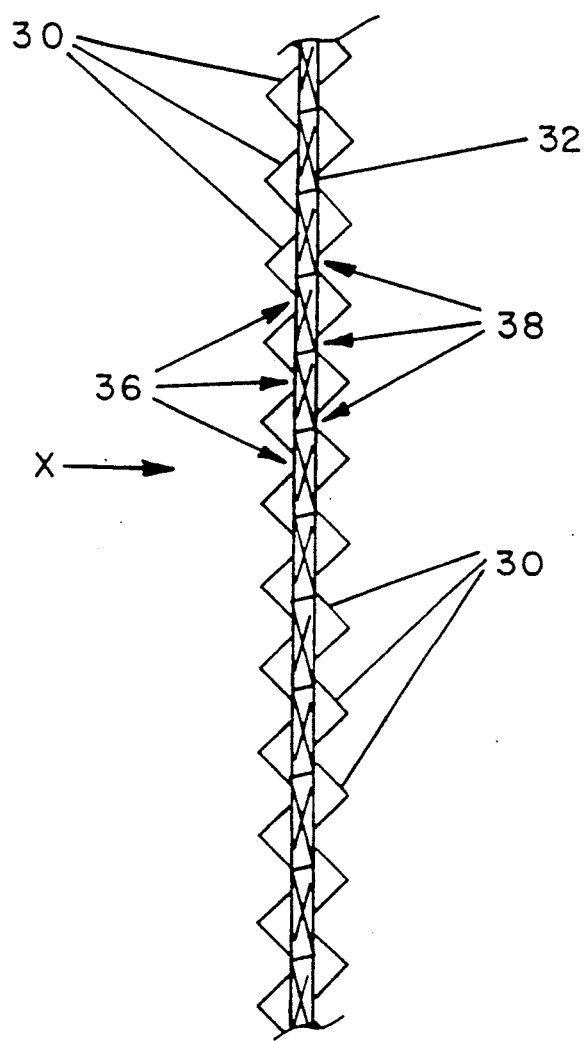
FIG. 5 is a top plan view of the demister of the present invention.

Referring to FIG. 1, there is shown a typical wet scrubber system in which the impingement board and demister of the present invention can be used. The scrubber system comprises, from left to right, a dust inlet box 2 with inlet openings 4, pod section 6, impeller section 8, air fan casing 10, nozzle and transition box 12 with water inlet flange 14, demister box 16, silencer box 18, final or outlet filter 20 and skid/stand 22. The airstream flows from left to right in the system shown. Referring to FIGS. 2-4, there is shown an impingement board of the present invention which in the scrubber system of FIG. 1 is positioned in the nozzle and transition box 12 downstream of water inlet flange 14. The impingement board is kept continuously wet by a spray of water. Water inlet flange 14 supplies water to several water nozzles (not shown) that continuously spray water into the dust laden airstream and onto the impingement board. The dust/water mix runs down the impingement board and to a drain positioned in the bottom wall of the demister box 16. In the embodiment shown in FIGS. 2-4, the impingement board comprises a generally rectangular frame 24 of $\frac{1}{4}''$ by $1\frac{1}{4}''$ flat, steel plate, longitudinally or vertically disposed $\frac{1}{4}''$ by $1''$ steel strips 26 across the shorter side of the rectangular frame and horizontally disposed $\frac{1}{4}''$ steel spacers 28. The strips 26 are spaced apart about $\frac{1}{2}''$. The first and last strips, adjacent to the frame member 24, are spaced $\frac{1}{2}''$ from the inner edge of the frame. The direction of airflow is denoted by x. The impingement board removes on the order of 25 to 35 per cent of the dust and water from the airstream. The dimensions of the impingement board of FIGS. 2-4 are about 30'' by 40''. The dimensions of the board can, of course, vary. Also, while the impingement board is usually rectangular, it can take other configurations such as a square, circular, oval or triangular, in order to accommodate the design of the particular wet scrubber system in which it is to be used. The board can be made from material other than steel such as reinforced plastic. In the embodiment shown in FIGS. 2-4, the strips 26 are arranged vertically; the strips can be arranged horizontally or diagonally also. While the spacing between the strips is shown as $\frac{1}{2}''$, the spacing may vary between about $\frac{3}{8}''$ to $\frac{5}{8}''$. The most efficient spacing of the strips, as well as the width of the strips, is easily determinable by one of ordinary skill in the art using routine experimentation and giving due consideration to the velocity of the airstream and the amount of water and dust particles.

Figure 6:
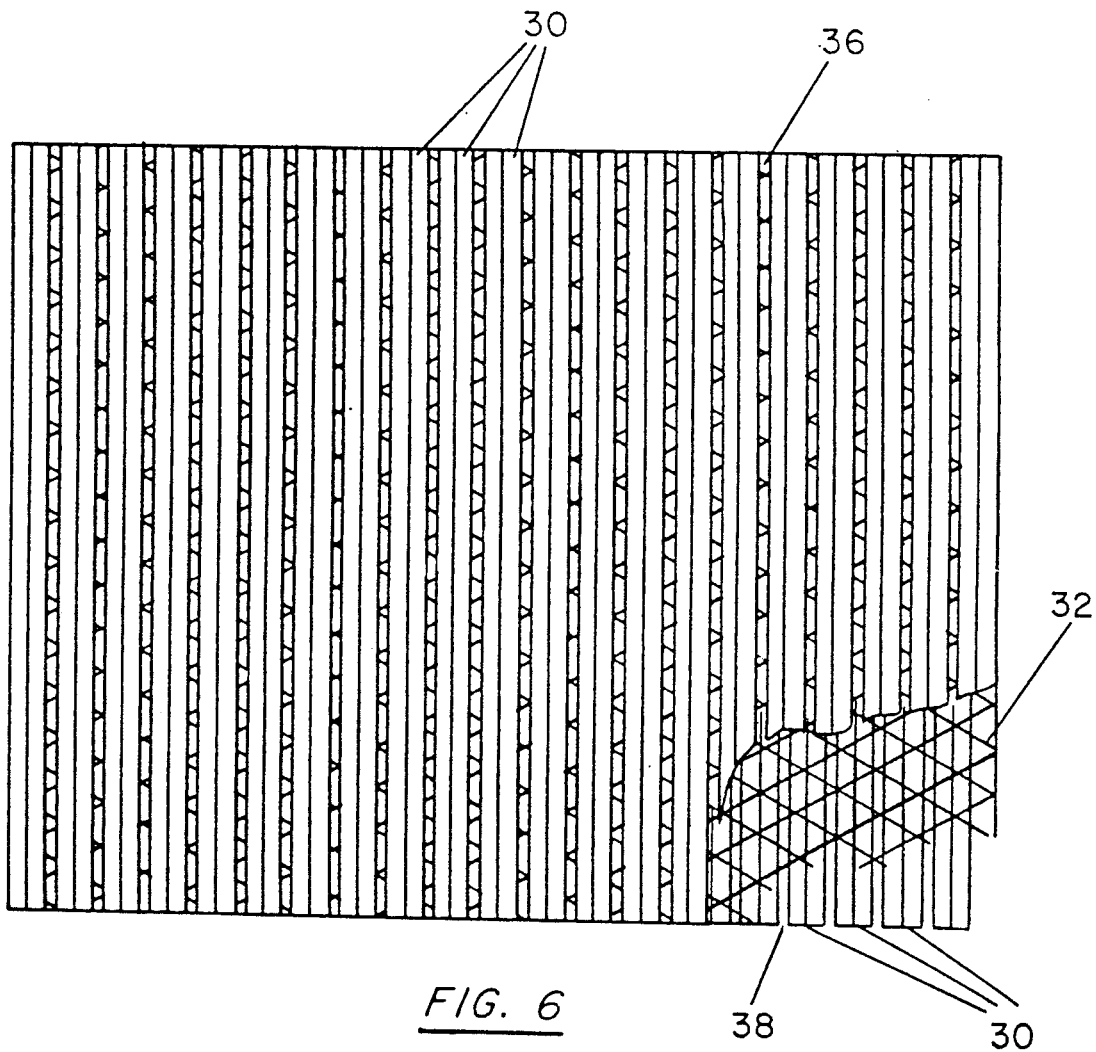
FIG. 6 is a front elevational view of the demister of FIG. 5.

Referring to FIGS. 5 and 6, there is shown a demister of the present invention comprising a plurality of generally V-shaped members 30 which are separated at their base by a wire screen 32. The generally V-shaped members are made of 12 gauge sheet metal. The wire screen is a number 9-2'' standard expanded metal. In the embodiment shown, the width of the base of the generally V-shaped member is 1.75'' and the depth, from the base to the apex, is 1.125''. The length or height of member 30 is about 31 inches. In each row, the V-shaped members, at the base, are spaced apart about $\frac{1}{2}$ inch. In addition, as best seen in FIG. 5, the V-shaped members 30 in the first row are offset with those of the second row so that an essentially Z-shaped pattern or passageway for the airstream is made. Intermittent airstream entrances are made at 36 and exits at 38 in the Z-shaped passageway in view of the spacing between members 30 in each row. The wire screen 32 measures about 31'' by 46''. The V-shaped members 30, at the base thereof, are tack welded to the expanded metal screen 32. In the scrubber system shown in FIG. 1, the demister is positioned to the left side of demister box 16 and accessed via door 34. The demister of the present invention removes virtually all moisture and dust remaining in the airstream emitting from the impingement board. As the moisture/dust airstream swirls about because of the design of the generally V-shaped members 30, it collects on the surface of the V-shaped members and flows downward thereon to flow into a drain (not shown) positioned in the bottom wall of the demister box. To insure even more complete removal of moisture laden dust from the airstream coming from the demister of the present invention, a secondary demister of conventional design such as a fibrous filter can be positioned downstream thereof. Although specific dimensions have been given for the V-shaped members and spacing therebetween and mesh size of the screen in order to describe a specific embodiment of the invention, the invention is not limited thereto. Provided with the design described herein, one of ordinary skill in the art through routine testing can determine the most advantageous dimensions, spacing and screen mesh size for a particular wet scrubber system.

What is claimed is:

1. In a wet scrubber system employing an impingement board and a demister, the improvement comprising:
   an impingement board comprising frame means and a plurality of flat strips secured to said frame, said strips being arranged side by side with a space therebetween sufficient to permit passage of an airstream, said strips being arranged in a single plane and
   a demister comprising a first row of generally V-shaped members and a second row of generally V-shaped members parallel to the first row, an expanded metal screen separating said first and second row, said members being attached at the base thereof to said screen, said members being spaced apart in each row sufficient to permit the passage of an airstream and said members of the first row being offset with the members of the second row in an essentially Z-shaped pattern.

2. The improvement according to claim 1 wherein said frame is rectangular and said strips are vertically disposed across the shorter side of the rectangular frame.

3. The improvement according to claim 2 wherein said strips are about one inch wide and said strips are spaced apart about one-half inch.

4. The improvement according to claim 1 wherein the screen is a number 9, 2 inch standard expanded metal.

5. The improvement according to claim 4 wherein said V-shaped members, in each row, are spaced apart about one-half inch at the base thereof.

6. A demister for use in a wet scrubber system which comprises a first row of generally V-shaped members and a second row of generally V-shaped members parallel to the first row, an expanded metal screen separating said first and second row, said members being attached at the base thereof to said screen, said members being spaced apart in each row sufficient to permit the passage of an airstream and said members of the first row being offset with the members of the second row in an essentially Z-shaped pattern.

7. The demister according to claim 6 wherein the screen is a number 9, 2 inch standard expanded metal.

8. The demister according to claim 6 wherein said V-shaped members, in each row, are spaced apart about one-half inch at the base thereof.

* * * * *